(12) United States Patent
Imamura

(10) Patent No.: US 9,660,232 B2
(45) Date of Patent: May 23, 2017

(54) BUTTON CELL TERMINAL

(71) Applicant: DENSO CORPORATION, Kariya, Aichi-pref. (JP)

(72) Inventor: Hikaru Imamura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/034,935

(22) PCT Filed: Oct. 16, 2014

(86) PCT No.: PCT/JP2014/005239
§ 371 (c)(1),
(2) Date: May 6, 2016

(87) PCT Pub. No.: WO2015/068336
PCT Pub. Date: May 14, 2015

(65) Prior Publication Data
US 2016/0293911 A1    Oct. 6, 2016

(30) Foreign Application Priority Data
Nov. 11, 2013  (JP) ................. 2013-232897

(51) Int. Cl.
*H01R 3/00* (2006.01)
*H01M 2/10* (2006.01)
(Continued)

(52) U.S. Cl.
CPC .......... *H01M 2/1044* (2013.01); *H01M 2/10* (2013.01); *H01M 2/1038* (2013.01); *H01M 2/20* (2013.01);
(Continued)

(58) Field of Classification Search
USPC ......................................... 439/500
See application file for complete search history.

(56) References Cited

U.S. PATENT DOCUMENTS 5,931,693 A * 8/1999 Yamazaki ........... H01M 2/1044
429/96
6,722,916 B2 * 4/2004 Buccinna ............ H01M 2/1044
439/500
(Continued)

FOREIGN PATENT DOCUMENTS

JP     S58000925 Y2   8/1983
JP     2004087191 A   3/2004
(Continued)

*Primary Examiner* — Tho D Ta
(74) *Attorney, Agent, or Firm* — Harness, Dickey & Pierce, P.L.C.

(57) ABSTRACT

A button cell terminal to electrically connect to a button cell and a circuit board includes: a spring contact terminal; a board joint; and a pressing force absorbing spring portion. The spring contact terminal is arranged into a spring shape deforming elastically in response to pressing force from the button cell in the X-axis direction and the Z-axis direction. The board joint is joined to the circuit board. The pressing force absorbing spring portion includes a bent arm for absorbing pressing force from the button cell through elastic deformation in response to pressing force from the button cell in the X-axis direction and the Y-axis direction.

6 Claims, 2 Drawing Sheets

(51) Int. Cl.
   *H01M 2/20*   (2006.01)
   *H01M 2/30*   (2006.01)
   *H01R 12/57*  (2011.01)
   *H01R 11/28*  (2006.01)

(52) U.S. Cl.
   CPC .............. *H01M 2/30* (2013.01); *H01R 12/57* (2013.01); *H01R 11/281* (2013.01)

(56) References Cited

U.S. PATENT DOCUMENTS

| | | | | |
|---|---|---|---|---|
| 7,059,894 | B1* | 6/2006 | Huang | H01M 2/1044 |
| | | | | 439/500 |
| 7,390,215 | B2* | 6/2008 | Liao | H01R 11/282 |
| | | | | 429/96 |
| 7,473,126 | B1* | 1/2009 | Chen | H01M 2/1038 |
| | | | | 429/100 |
| 7,641,508 | B2* | 1/2010 | Chen | H01R 11/286 |
| | | | | 439/500 |
| 2003/0162436 | A1 | 8/2003 | Nakagawa | |
| 2004/0038585 | A1 | 2/2004 | Sugimoto et al. | |

FOREIGN PATENT DOCUMENTS

| | | | |
|---|---|---|---|
| JP | 3818174 | B2 | 9/2006 |
| JP | 2007194032 | A | 8/2007 |
| JP | 2013084384 | A | 5/2013 |

\* cited by examiner

BUTTON CELL TERMINAL

CROSS REFERENCE TO RELATED APPLICATIONS

This application is a U.S. National Phase Application under 35 U.S.C. 371 of International Application No. PCT/JP2014/005239 filed on Oct. 16, 2014 and published in Japanese as WO 2015/068336 A1 on May 14, 2015. This application is based on and claims the benefit of priority from Japanese Patent Application No. 2013-232897 filed on Nov. 11,2013. The entire disclosures of all of the above applications are incorporated herein by reference.

TECHNICAL FIELD

The present disclosure relates to a button cell terminal for electrically connecting a button cell and a circuit board.

BACKGROUND ART

In electrical equipment such as car wireless transmitters or the like that use button batteries as the drive power source, conventionally, a button cell terminal is provided for electrically connecting a button cell with a circuit board, as disclosed for example in Patent Literature 1. Patent Literature 1 proposes a cell holder assembled to the circuit board in order to define the positional relationship between the button cell and the terminal. However, this configuration poses limitations on the print board design because of the shape required for the assembling of the cell holder. There are terminals that do not need cell holders, but most of them have to be manually mounted and are not fit for automated mounting (reflow soldering). Because of this, the positioning precision of the button cell is low (button cell can easily move), and the cell is subjected to high stress. Large through holes (holes for inserting components to mount them) and lands (copper foil for the soldering) are therefore essential for providing robust solder connections. This results in a smaller available mounting space and poses limitations on the print board design.

Button cell terminals are prone to plastic deformation because of the structure in which the cell insertion direction and deformation/loading direction are different (vectors are perpendicular to each other), and if it should occur, the plastic deformation leads to a connection failure. There are also terminals that are not mounted on the circuit board (board contact terminals). However, when subjected to vibration or dropped, an instantaneous disconnection is highly likely to occur in terminals of this type, and there is also the possibility of oxidation on the contacts (fretting). These terminals are therefore prone to connection failures and can induce shortening of the product life.

PRIOR ART LITERATURES

Patent Literature

Patent Literature 1: JP-2004-87191-A

SUMMARY OF INVENTION

An object of the present disclosure is to provide a button cell terminal for use in a configuration without a cell holder, which improves the degree of freedom in print board design by obviating the need for large through holes or lands, and which is mounted on a circuit board without inducing connection failures.

According to an aspect of the present disclosure, a button cell terminal to electrically connect a circuit board and a button cell includes a spring contact terminal, a board joint that is joined to the circuit board, and a pressing force absorbing spring portion. When one direction along a plane direction of the button cell is defined as an X-axis direction; a direction along the plane direction and perpendicular to the X-axis direction is defined as a Y-axis direction; and a direction perpendicular to the X-axis direction and the Y-axis direction and along a thickness direction of the button cell is defined as a Z-axis direction, the spring contact terminal is pressed by an outer circumferential surface of a positive electrode of the button cell, and is arranged into a spring shape that elastically deforms in accordance with a pressing force exerted from the button cell in the X-axis direction and in the Z-axis direction; the board joint is joined to the circuit board; and the pressing force absorbing spring portion is arranged between the board joint and the spring contact terminal so as to be elastically deformable, and absorbs the pressing force of the button cell received at the spring contact terminal through elastic deformation regardless of presence or absence of a cell holder defining a position of the button cell. In addition, the pressing force absorbing spring portion has a distal end portion connected to the spring contact terminal, and includes a bent arm arranged into a spring shape that elastically deforms in accordance with the pressing force from the button cell in the X-axis direction and in the Y-axis direction to absorb the pressing force from the button cell.

As set forth above, the button cell terminal includes the spring contact terminal formed into a spring shape that elastically deforms in accordance with a pressing force from the button cell in the X-axis direction and in the Z-axis direction, and the bent arm formed into a spring shape that absorbs the pressing force from the button cell by using the resilient deformation in accordance with the pressing force from the button cell in the X-axis direction and in the Y-axis direction. Accordingly, even if the button cell terminal is subjected to a high stress because of a displacement between the button cell and the button cell terminal due to a drop or vibration in a configuration where a cell holder is not provided, such stress can be absorbed without robust solder connections. Therefore, large through holes or lands for providing robust solder connections are made unnecessary, as a result of which the degree of freedom in printed board design can be improved. Also, in a configuration where the button cell terminal is mounted on the circuit board, instantaneous disconnections or connection failures of the button cell terminal mounted on the circuit board can be prevented, because the spring contact terminal and the bent arm provide a spring reaction force to secure a high contact pressing force between the terminal and the button cell.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, one embodiment of a button cell terminal of the present disclosure will be described with reference to the drawings. The button cell terminal of this embodiment is applied to electrical equipment such as a car wireless transmitter or the like, for example, which wirelessly transmits a signal for activating a door lock device of a car to a receiver mounted on the car, and establishes electrical connection between the button cell and a circuit board.

Figure 1:
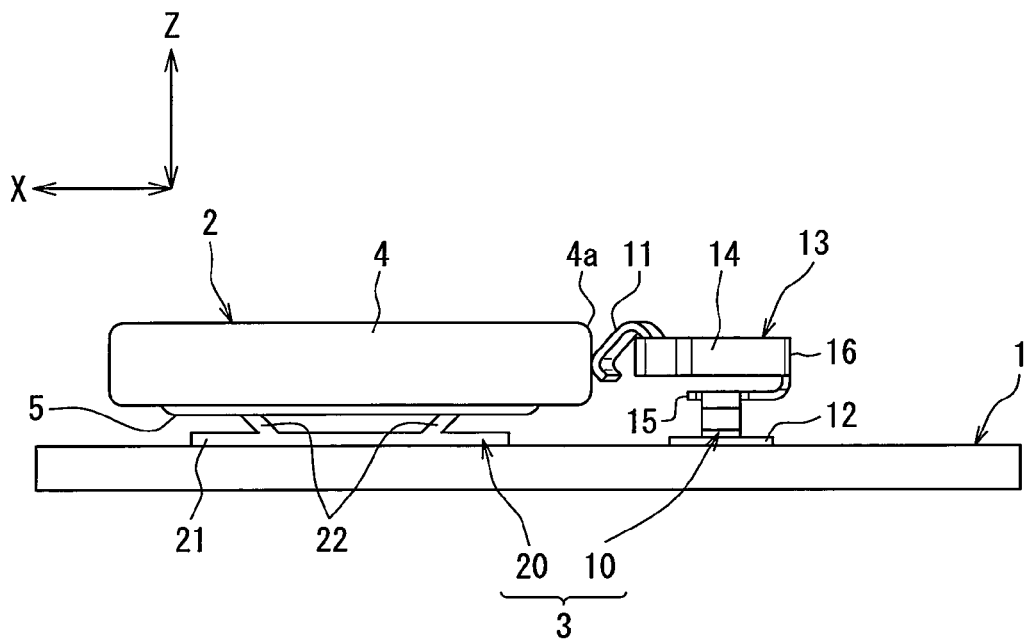
FIG. 1 is a side view illustrating a circuit board having a button cell terminal according to one embodiment of the present disclosure mounted on the circuit board, and a button cell.

A circuit board 1 on which various electrical parts of an electronic component unit are mounted is accommodated in a case (not shown) that is part of electrical equipment, as shown in FIG. 1. An IC (Integrated Circuit), not shown, that controls the operation of the electrical equipment, and a cell terminal 3 that holds a button cell 2, which is to be the power source of the electrical equipment, in electrical connection therewith, are mounted on the mounting surface of the circuit board 1.

The cell terminal 3 includes a positive cell terminal 10 (corresponding to the button cell terminal) connected to a positive electrode 4 of the button cell 2, and a negative cell terminal 20 connected to a negative electrode 5 of the button cell 2, and is entirely made of metal to constitute an electrical contact point with the button cell 2. These terminals 10 and 20 are mounted on the circuit board 1 by soldering or the like, for example.

Figure 2:
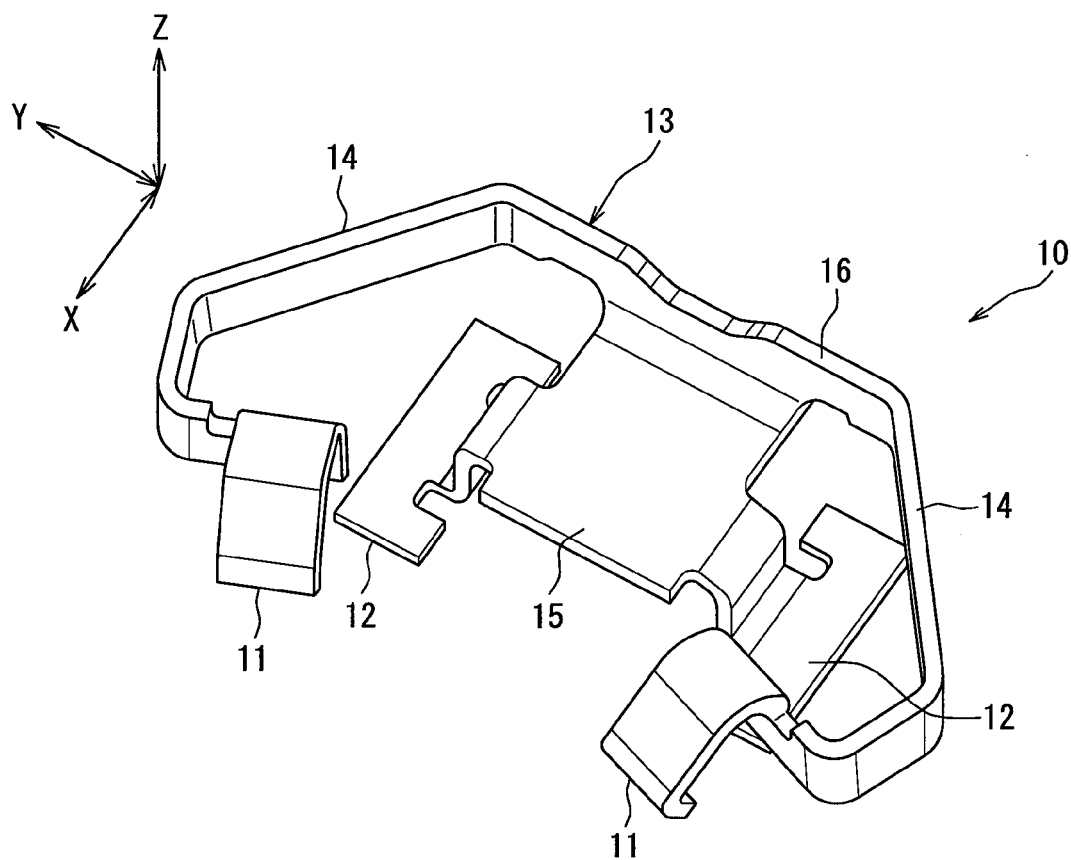
FIG. 2 is a perspective view illustrating the button cell terminal.
Figure 3:
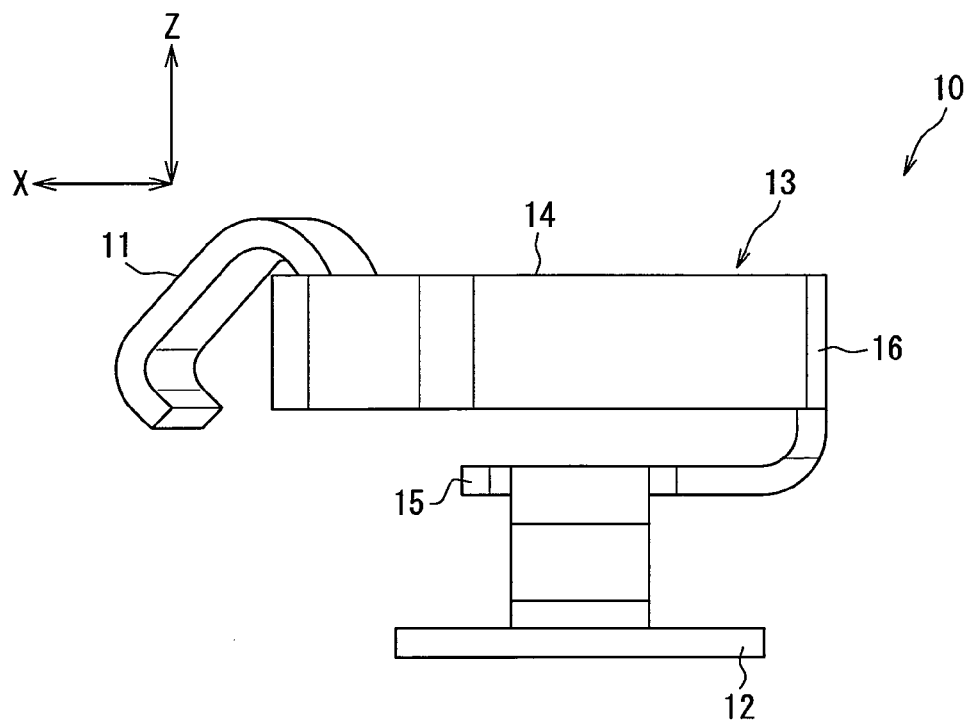
FIG. 3 is a side view illustrating the button cell terminal.

The positive cell terminal 10 includes, as shown in FIG. 2 and FIG. 3, a pair of right and left spring contact terminals 11 that make contact with an outer circumferential surface 4a of the positive electrode 4 of the button cell 2 pressed to the spring contact terminals, a pair of right and left board joints 12 joined to the circuit board 1, and a pressing force absorbing spring portion 13 provided between the spring contact terminals 11 and the board joints 12 so as to be elastically deformable. The spring contact terminals 11, the board joints 12, and the pressing force absorbing spring portion 13 are made from sheet metal (conductive member) in one piece.

The spring contact terminals 11 are formed into a spring shape that elastically deforms in accordance with the pressing force from the button cell 2 in a front-to-back direction, in other words a front-to-back direction of the positive cell terminal 10 (X-axis direction shown in FIG. 1 to FIG. 3), and in an up-and-down direction (Z-axis direction shown in FIG. 1 to FIG. 3). The board joints 12 have, on the backside thereof, mounting portions mounted to the circuit board 1 with solder. When not joined (mounted) on the circuit board 1, the board joints 12 are in the form of a shape that provides a support surface for supporting the positive cell terminal 10 in a self-standing state.

In the present disclosure, the front-to-back direction (X-axis direction) refers to one direction along a plane direction of the button cell 2, while the right-and-left direction (Y-axis direction) refers to one direction along a plane direction of the button cell 2 and perpendicular to the front-to-back direction. The up-and-down direction (Z-axis direction) refers to a direction perpendicular to the front-to-back and right-and-left directions and along a thickness direction of the button cell 2. In the present disclosure, "perpendicular" includes not only exactly perpendicular but also substantially perpendicular angles.

The pressing force absorbing spring portion 13 includes bent arms 14 which have distal ends connected to the respective spring contact terminals 11, a stepped surface 15 formed in a stepped manner relative to the board joints 12, and a bent piece 16 bent substantially perpendicularly upward from the rear end of this stepped surface 15, and absorbs the pressing force from the button cell 2 received by the spring contact terminals 11 by resilient deformation. The circuit board 1 of this embodiment does not include a cell holder for defining the position of the button cell 2. The pressing force absorbing spring portion 13 absorbs the pressing force from the button cell 2 irrespective of whether or not there is a cell holder.

The bent arms 14 are provided as a pair of right and left arms corresponding to the pair of right and left spring contact terminals 11, respectively. The bent arms 14 are bent in an X-Y plane extending along a right-and-left direction of the button cell 2, in other words in the lateral direction of the positive cell terminal 10 (Y-axis direction shown in FIG. 2), and in the front-to-back direction (X-axis direction), and absorbs the pressing force from the button cell 2 by resilient deformation in accordance with the pressing force in the front-to-back direction (X-axis direction) and right-and-left direction (Y-axis direction) of the button cell 2. The rear ends of the pair of right and left bent arms 14 are connected to both ends of the bent piece 16. The positive cell terminal 10 having the pairs of right and left spring contact terminals 11, the board joints 12, and the bent arms 14 is formed symmetrical on the right and left sides in the Y-axis direction, which is the lateral direction thereof.

The negative cell terminal 20 includes a sheet-like base 21 and a pair of flexible portions 21, and is mounted on the circuit board 1 at the backside of the base 21 as the soldered portion. When the button cell 2 is set in the cell terminal 3, the negative cell terminal 20 makes contact with the negative electrode 5 of the button cell 2 with the pair of flexible portions 21 being flexed. Thus, the flexible portions 21 assume a state in which the flexible portions push the button cell 2 upward, so that the upper face of the button cell 2 is pressed against a support piece (not shown) of the case that forms part of the electrical equipment and the button cell 2 is thereby set in position inside the case.

Next, the effects of the positive cell terminal 10 will be described. When the electrical equipment containing the circuit board 1 is dropped, or subjected to vibration, the positive cell terminal 10 receives an impact load from the button cell 2. Here, the impact load is applied to the positive cell terminal 10 in directions in which there can be a looseness around the button cell 2, i.e., in the front-to-back direction (X-axis direction), the right-and-left direction (Y-axis direction), and the up-and-down direction (Z-axis direction) of the button cell 2. The positive cell terminal 10 receives such impact load from the button cell 2 via the right and left spring contact terminals 11 that are in pressing force contact with the outer circumferential surface 4a of the positive electrode 4.

The spring contact terminals 11 of the positive cell terminal 10 are formed into a spring shape that elastically deforms in accordance with the pressing force from the button cell 2 in the front-to-back direction (X-axis direction) and the up-and-down direction (Z-axis direction) of the button cell 2 as described above, so that the spring contact terminals 11 bend or deform along the X-axis direction and the Z-axis direction to absorb the impact load from the button cell 2 in the X-axis direction and the Z-axis direction. Moreover, the bent arms 14 that form the pressing force absorbing spring portion 13 are formed into a spring shape that elastically deforms in accordance with the pressing force from the button cell 2 in the front-to-back direction (X-axis direction) and the right-and-left direction (Y-axis direction) of the button cell 2, so that the bent arms 14 bend or deform along the X-axis direction and the Y-axis direction to absorb the impact load from the button cell 2 in the X-axis direction and the Y-axis direction.

The stepped surface 15 and the bent piece 16 that form the pressing force absorbing spring portion 13 are provided between the board joints 12 and the bent arms 14. Therefore, part of the impact load from the button cell 2 that cannot be absorbed by the spring contact terminals 11 and the bent arms 14 is dispersed on the stepped surface 15 and the bent piece 16, so that the impact load from the button cell 2 is hardly applied to the board joints 12. Even when the electrical equipment is dropped and the circuit board 1 is subjected to vibration, the impact load applied from the button cell 2 in the direction of the board joints 12 to the positive cell terminal 10 hardly reaches the board joints 12 directly. Thus the drop impact resistance of the positive cell terminal 10 can be improved.

As described above, according to the configuration of this embodiment, the positive cell terminal 10 that electrically connects the button cell 2 with the circuit board 1 includes the spring contact terminal 11, the board joint 12 joined to the circuit board 1, and the pressing force absorbing spring portion 13. The spring contact terminal 11 makes contact with an outer circumferential surface of the positive electrode of the button cell 2 pressed to the spring contact terminal 11, and is formed into a spring shape that elastically deforms in accordance with the pressing force in the front-to-back direction and the up-and-down direction of the button cell 2. The pressing force absorbing spring portion 13 is provided such as to be elastically deformable between the board joint 12 and the spring contact terminal 11, and absorbs the pressing force from the button cell 2 received at the spring contact terminal 11 by resilient deformation of itself, irrespective of whether or not there is a cell holder that defines a position of the button cell 2. The pressing force absorbing spring portion 13 includes the bent arm 14 which has a distal end connected to the spring contact terminal 11 and which is formed into a spring shape that elastically deforms in accordance with the pressing force from the button cell 2 in the front-to-back direction and right-and-left direction of the button cell 2 to absorb the pressing force from the button cell 2.

As described above, the positive cell terminal 10 includes the spring contact terminal 11 formed into a spring shape that elastically deforms in accordance with the pressing force in the front-to-back direction and the up-and-down direction of the button cell 2, and the bent arm 14 that absorbs the pressing force from the button cell 2 by resilient deformation in accordance with the pressing force in the front-to-back direction and the right-and-left direction of the button cell 2. Accordingly, even in a configuration without a cell holder, in a case where the positive cell terminal 10 is subjected to a high stress because of misalignment between the button cell 2 and the positive cell terminal 10 due to a drop or vibration, such stress can be absorbed without robust solder connections. Accordingly, large through holes and lands for providing robust solder connections can be made unnecessary, as a result of which the degree of freedom in print board design can be made higher. In a configuration where the positive cell terminal 10 is mounted on the circuit board 1, the spring reaction force of the spring contact terminal 11 and the bent arm 14 provides a high contact pressing force between the terminal and the button cell 2, so that an instantaneous interruption or connection failure between the cell and the positive cell terminal 10 mounted on the circuit board 1 can be prevented. Moreover, by dispensing with the cell holder, the number of components can be reduced, and the size of the electrical equipment can be made smaller.

The board joint 12 is formed into a shape that provides a support surface for holding the positive cell terminal 10 in a self-standing state, when not joined to the circuit board 1. Since the positive cell terminal 10 can be made to stand alone, automated mounting (reflow soldering) of the positive cell terminal 10 onto the circuit board 1 is possible.

The pressing force absorbing spring portion 13 also includes the stepped surface 15 formed in a stepped manner relative to the board joint 12, and a bent piece 16 bent substantially perpendicularly upward from the rear end of this stepped surface 15, the bent piece 16 having a side portion connected to a rear end of the bent arm 14. In this way, the stepped surface 15 and the bent piece 16 can be provided to be present between the board joint 12 and the bent arm 14. Therefore, part of the impact load from the button cell 2 that cannot be absorbed by the spring contact terminal 11 and the bent arm 14 is dispersed on the stepped surface 15 and the bent piece 16, so that the impact load from the button cell 2 is hardly applied to the board joint 12.

The spring contact terminal 11 is provided as a pair of right and left terminals that make contact with different discrete portions of the outer circumferential surface 4a of the positive electrode 4 of the button cell 2, and the bent arm 14 is provided as a pair of right and left arms corresponding to this pair of right and left spring contact terminals 11, respectively. Accordingly, the positive cell terminal 10 can be connected to the positive electrode 4 of the button cell 2 in a state where the outer circumferential surface 4a of the positive electrode 4 of the button cell 2 is held on both sides with the right and left spring contact terminals 11 connected to the respective distal ends of the right and left bent arms 14.

The spring contact terminal 11, the board joint 12, and the pressing force absorbing spring portion 13 are all made in one piece from a sheet-like conductive member. Accordingly, electrical connection between various constituent elements (spring contact terminal 11, board joint 12, and pressing force absorbing spring portion 13) is reliably established, as well as the number of components can be reduced.

Although the button cell terminal (positive cell terminal) illustrated in the embodiment described above includes the stepped surface 15 in the pressing force absorbing spring portion 13, the configuration of the terminal is not limited to this. A modification of the configuration of the positive cell terminal will be hereinafter described with reference to FIG. 4. In the following description, constituent parts similar to those of the positive cell terminal 10 of the previously described embodiment are given the same reference numerals and will not be described in detail.

Figure 4:
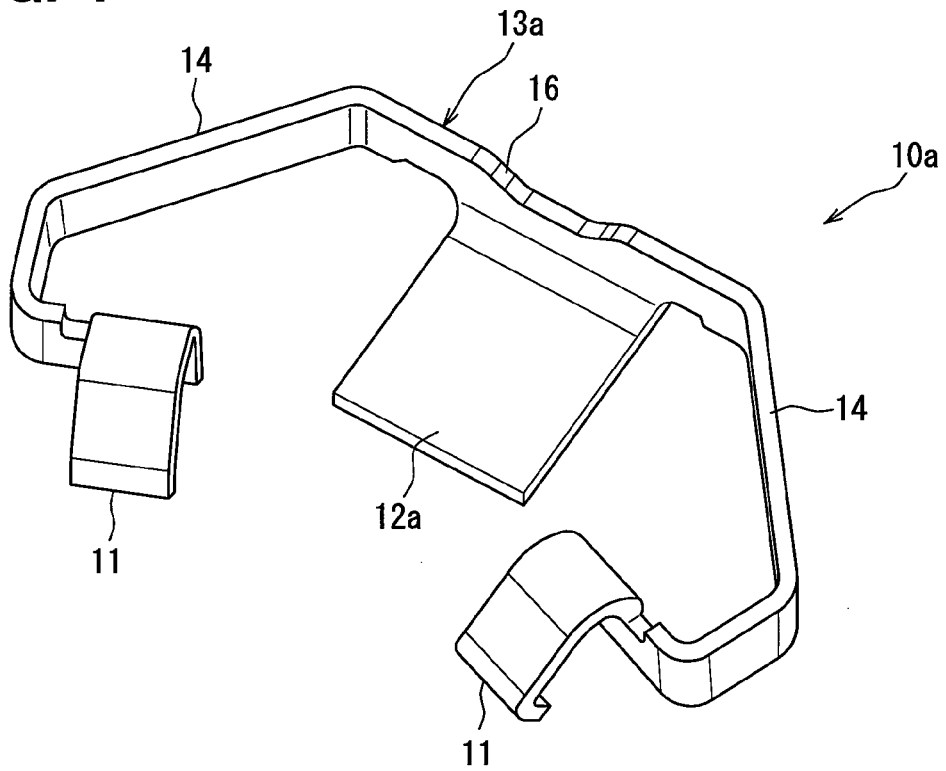
FIG. 4 is a perspective view illustrating the button cell terminal in a modification.

As shown in FIG. 4, the positive cell terminal 10a of the modification includes, similarly to the previously described positive cell terminal 10, a pair of right and left spring contact terminals 11, a pair of right and left bent arms 14 having distal ends connected to the right and left spring contact terminals 11, respectively, and a bent piece 16 to which rear ends of the right and left bent arms 14 are connected. The positive cell terminal 10a does not include the stepped surface 15 unlike the positive cell terminal 10, and a plate-like portion bent forward from the lower end of the bent piece 16 forms the board joint 12a that is joined to the circuit board 1.

Similarly to the previously described positive cell terminal 10, the positive cell terminal 10a of the modification absorbs the pressing force from the button cell 2 (for example, impact load when the electrical equipment is dropped) with the spring contact terminals 11 in the form of a spring that elastically deforms in accordance with the pressing force in the front-to-back direction and the up-and-down direction of the button cell 2, and with the bent arm 14 in the form of a spring that elastically deforms in accordance with the pressing force in the front-to-back direction and the right-and-left direction of the button cell 2. Since the positive cell terminal 10a does not include the stepped surface 15, the impact load is not dispersed as it is to the stepped surface 15 in the positive cell terminal 10. Because of this, the impact load from the button cell 2 is more readily applied to the board joint 12a, although slightly, as compared to the positive cell terminal 10.

While one embodiment of the present disclosure has been described above, this is given only for illustrative purposes, and the present invention is not limited to this embodiment and can be changed variously. For example, while the positive cell terminal 10, as the button cell terminal, is made from sheet metal in the configuration of the embodiment, the configuration is not limited to this embodiment. The terminal can be made from any other materials that have electrical conductivity (conductive materials).

What is claimed is:

1. A button cell terminal to electrically connect a circuit board and a button cell in which one direction along a plane direction of the button cell is defined as an X-axis direction, a direction along the plane direction and perpendicular to the X-axis direction is defined as a Y-axis direction, and a direction perpendicular to the X-axis direction and the Y-axis direction and along a thickness direction of the button cell is defined as a Z-axis direction, the button cell terminal comprising:
   a spring contact terminal that is pressed by an outer circumferential surface of a positive electrode of the button cell, and is arranged into a spring shape that elastically deforms in accordance with a pressing force exerted from the button cell in the X-axis direction and in the Z-axis direction;
   a board joint that is joined to the circuit board; and
   a pressing force absorbing spring portion that is arranged between the board joint and the spring contact terminal so as to be elastically deformable, and absorbs the pressing force of the button cell received at the spring contact terminal through elastic deformation regardless of presence or absence of a cell holder defining a position of the button cell,
   wherein:
   the pressing force absorbing spring portion has a distal end portion connected to the spring contact terminal, and includes a bent arm arranged into a spring shape that elastically deforms in accordance with the pressing force from the button cell in the X-axis direction and in the Y-axis direction to absorb the pressing force from the button cell; and
   the spring contact terminal is arranged as a pair of spring contact terminals arranged in the Y-axis direction, and is in contact with different parts of the outer circumferential surface of the positive electrode of the button cell.

2. The button cell terminal according to claim 1, wherein the board joint is arranged into a shape that includes a support surface for holding the button cell terminal in a self-supporting state, when the board joint is not joined to the circuit board.

3. The button cell terminal according to claim 1, wherein the pressing force absorbing spring portion includes:
   a stepped surface that is arranged in a stepped manner with respect to the board joint; and
   a bent piece that is bent in the Z-axis direction from a rear end of the stepped surface and perpendicular to the stepped surface, and that has a side portion connected to a rear end of the bent arm.

4. The button cell terminal according to claim 1, wherein:
   the bent arm is arranged as a pair of bent arms arranged in the Y-axis direction so as to correspond to the pair of spring contact terminals respectively.

5. The button cell terminal according to claim 1, wherein the spring contact terminal, the board joint, and the pressing force absorbing spring portion are configured into a single body with a plate conductive member.

6. A button cell terminal to electrically connect a circuit board and a button cell in which one direction along a plane direction of the button cell is defined as an X-axis direction, a direction along the plane direction and perpendicular to the X-axis direction is defined as a Y-axis direction, and a direction perpendicular to the X-axis direction and the Y-axis direction and along a thickness direction of the button cell is defined as a Z-axis direction, the button cell terminal comprising:
   a spring contact terminal that is pressed by an outer circumferential surface of a positive electrode of the button cell, and is arranged into a spring shape that elastically deforms in accordance with a pressing force exerted from the button cell in the X-axis direction and in the Z-axis direction;
   a board joint that is joined to the circuit board; and
   a pressing force absorbing spring portion that is arranged between the board joint and the spring contact terminal so as to be elastically deformable, and absorbs the pressing force of the button cell received at the spring contact terminal through elastic deformation regardless of presence or absence of a cell holder defining a position of the button cell, wherein
   the pressing force absorbing spring portion has a distal end portion connected to the spring contact terminal, and includes a bent arm arranged into a spring shape that elastically deforms in accordance with the pressing force from the button cell in the X-axis direction and in the Y-axis direction to absorb the pressing force from the button cell; and
   the pressing force absorbing spring portion includes:
   a stepped surface that is arranged in a stepped manner with respect to the board joint; and
   a ban piece that is bent in the Z-axis direction from a near end of the stepped surface and perpendicular to the stepped surface, and that has a side portion connected to a rear end of the bent arm.

* * * * *